United States Patent [19]

Rongren

[11] 4,019,062
[45] Apr. 19, 1977

[54] UNIT FOR TREATMENT OF SUBSTRATE WITH ULTRAVIOLET RADIATION

[76] Inventor: Eric H. Rongren, 22 W 750 Elmwood Ave., Glen Ellyn, Ill. 60137

[22] Filed: Sept. 11, 1975

[21] Appl. No.: 612,301

[52] U.S. Cl. .............................. 250/492 R; 250/504
[51] Int. Cl.² ......................................... F26B 3/30
[58] Field of Search .................. 250/492, 504, 505; 350/294; 34/41

[56] References Cited

UNITED STATES PATENTS

| | | | |
|---|---|---|---|
| 3,224,330 | 12/1965 | Kompfner | 350/294 |
| 3,453,425 | 7/1969 | Whitaker | 350/294 |
| 3,621,198 | 11/1971 | Herbrich | 250/504 |
| 3,829,982 | 8/1974 | Prey et al. | 34/41 |

*Primary Examiner*—Saxfield Chatmon, Jr.
*Assistant Examiner*—B. C. Anderson
*Attorney, Agent, or Firm*—Fitch, Even, Tabin & Luedeka

[57] ABSTRACT

A system, designed to cure an ultraviolet sensitive coating on a substrate that is moving in a direction transverse to the radiation emitted from the system, which includes a plurality of arrays of short-arc ultraviolet lamps, each array located in a suitable housing. The arc of each lamp in a given array is located at the focus of an associated paraboloidal reflector mounted within the housing so that at least half of the ultraviolet radiation emanating from the arc is reflected by the paraboloidal reflector to produce a collimated beam of ultraviolet radiation directed toward a concave spherical reflector whose center is located axially with the paraboloidal reflector. As measured between the two reflectors, the axis of the spherical reflector normally forms a (45°) angle with respect to the axis of the paraboloidal reflector to reflect the collimated beam toward the substrate. Because of the concave surface of the spherical reflector, the radiant energy is focused to a small area on the substrate. This area is adjustable over a wide range depending on the focal lengths of the spherical and paraboloidal reflectors which are chosen so as to arrive at the most desirable intensity of radiation for the particular sensitivity of the coating being treated. Each array produces a set of disconnected high intensity image areas on the substrate, with the totality of arrays providing complete coverage across the width of the substrate. Within each array, the spherical reflectors are mounted to an assembly within the housing for pivotal movement into a position to reflect the focused beam 180° from its normal direction so that no energy strikes the substrate when it is not in motion.

14 Claims, 5 Drawing Figures

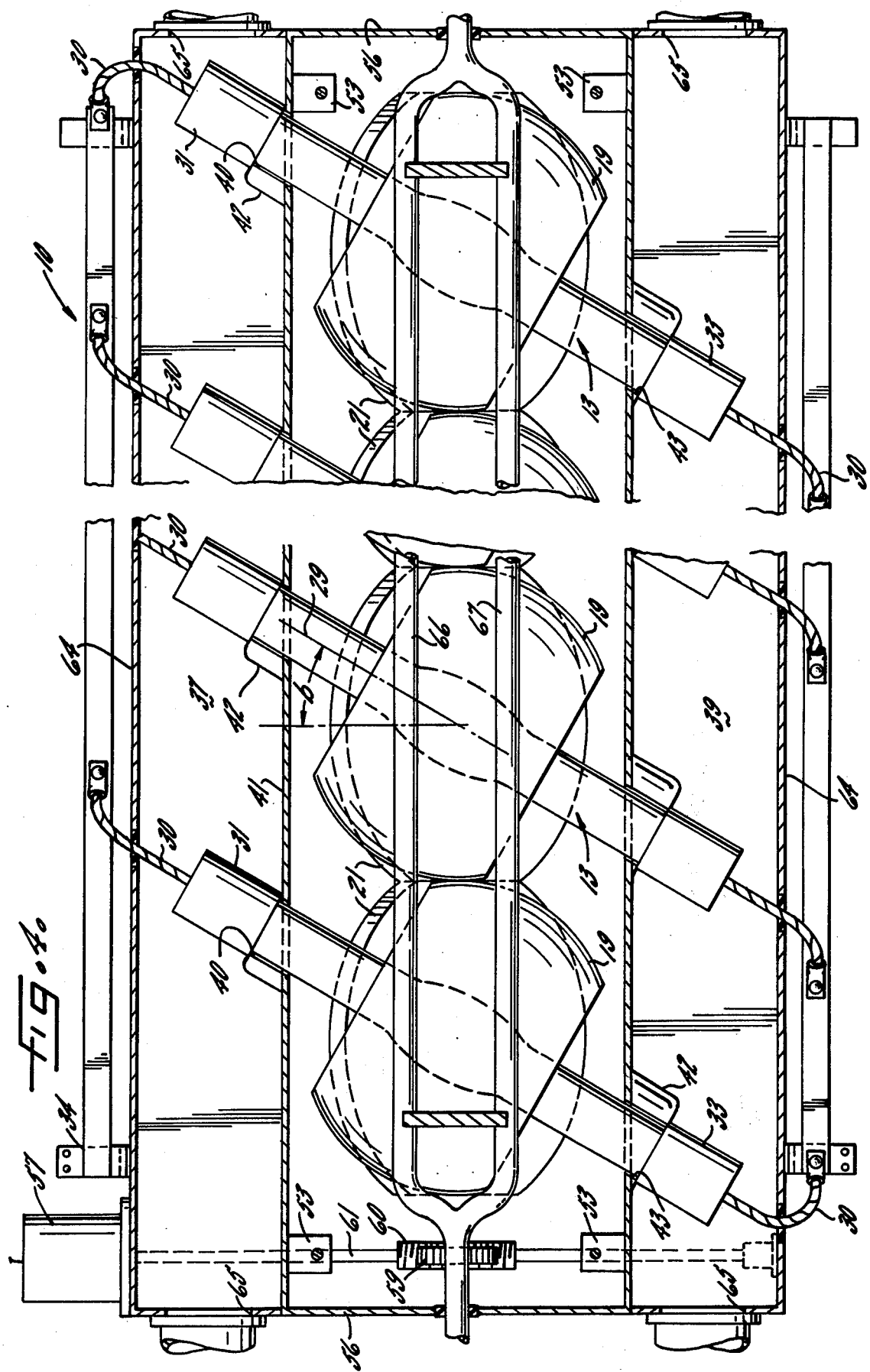

UNIT FOR TREATMENT OF SUBSTRATE WITH ULTRAVIOLET RADIATION

BACKGROUND OF THE INVENTION

The present invention relates to a unit of the type used in treating a substance, such as printing ink, paint, coating resins of various compositions or the like, which contains an ultraviolet-sensitive compound to effect rapid setting or curing of the substance when subjected to ultraviolet radiation after being applied as a coating to a substrate such as an article made of paper, metal, plastic or other material. More particularly, the invention relates to a unit including at least one lamp such as a mercury vapor lamp designed to produce ultraviolet radiation when energized and having a curved reflector mounted within the lamp housing behind the lamp to reflect the radiation from the lamp out of the housing and onto the coated substrate which may be located below the housing. Units of this general character are disclosed in U.S. Pat. Nos. 3,829,982; 3,826,014; 3,745,307; 3,733,709 and 3,159,464.

In treating a substance containing an ultraviolet-sensitive compound, the degree to which the substance is cured upon being subjected to the ultraviolet radiation depends upon the intensity of the ultraviolet radiation applied to the substance and the length of time which the radiation is applied. Thus, for a higher intensity of ultraviolet radiation, less time is required to achieve the same degree of curing than for a lower intensity of ultraviolet radiation. Further, the higher intensity radiation provides relatively greater absorption into the interior of the substance and thereby allows relatively thicker coatings or relatively less ultraviolet sensitive coatings of identical thickness to be cured. Examples of these less sensitive coatings are coatings to which pigments have been added; with black pigments commonly producing the greatest deterioration in ultraviolet light sensitivity. One system presently used to cure ultraviolet sensitive coatings employs a long-arc ultraviolet lamp with an elliptical reflector. This system, however, has proved to be unsatisfactory when high intensity levels are required since the intensity at the substrate in such a system is normally less than 1.2 watts × $F/mm^2$ (F representing an efficiency factor defined in the table shown hereinafter).

A primary objective of the present invention is to provide a new and improved unit of the foregoing general character for concentrating the ultraviolet radiation emitted from the lamp into a small area of high intensity on the coated substrate so as to make more efficient utilization of the ultraviolet radiation emitted from the lamp, thereby reducing the time required for curing an equivalent thickness of coated substrate or for achieving a cure of thicker and less sensitive coatings at an equivalent time.

A more detailed object is to achieve the foregoing by constructing the unit so that the ultraviolet radiation from the unit strikes the coated substrate at spaced locations along the width thereof with high intensity beams, complete coverage of the width of the substrate being achieved through the use of a cluster of similar units whose emitted beams strike the substrate at staggered positions with respect to the beams of other units thereby subjecting the entire width of the coating to a uniform high intensity radiation as collectively emitted from the cluster.

An additional object is to construct the cluster of units so that the staggered beams from the units strike the substrate coating in an overlapping manner by a significant percentage to enable selective adjustment in the intensity of the radiation striking the coating to be achieved by de-energizing, either partially or completely selected lamps within each array.

A still further object is to produce the high intensity beams of ultraviolet radiation through the use of an array of short-arc ultraviolet lamps in each unit with the emitted radiation of each lamp being separately controlled to enable selective adjustment in the intensity of the radiation striking the coated substrate.

Another object of the present invention is to provide a unit in which the intensity of the ultraviolet radiation striking the coated substrate may be adjusted selectively for substances of differing ultraviolet sensitivity to that intensity which more efficiently cures the coating on the substrate.

A more detailed object is to apply high intensity ultraviolet radiation to the substrate coating by concentrating the radiation emitted from each of the lamps in said array through the use of a pair of reflectors associated with each lamp to first collimate the radiation emitted from the lamp in a beam and, thereafter, to reflect the collimated beam toward the substrate in such manner that the rays of the beam are focused upon the substrate coating so that the intensity of the ultraviolet radiation striking the coating is increased substantially over the intensity of the radiation in the collimated beam.

The invention also resides in the novel construction of the unit wherein each pair of reflectors comprises a paraboloidal reflector and a concave spherical reflector and wherein the short-arc lamp is located adjacent the paraboloidal reflector with the arc of the lamp positioned substantially at the focus of said reflector so that radiation from the lamp is reflected from the paraboloidal reflector in a collimated beam toward the spherical reflector which in turn, reflects and focuses said beam on the coated substrate to provide a magnified image of the object lamp arc by a ratio equal to the ratio of the focal length of the spherical reflector to the focal length of the paraboloidal reflector. Said magnified arc image area can be varied by changing the focal lengths of either the spherical reflector or the paraboloidal reflector or both to thereby change the ratio of their focal lengths and in turn the arc image area on the coated substrate.

Still further, the invention resides in the novel manner of mounting the spherical reflector in the unit for movement between a first position reflecting the collimated beam toward the coated substrate and a second position reflecting the collimated beam in another direction so as to avoid prolonged application of ultraviolet radiation to the coating in the event movement of the substrate should be halted beneath the unit.

In addition, the invention resides in the novel manner of cooling the reflectors and the lamps within each array during use.

These and other objects and advantages of the present invention will become more apparent from the following detailed description when taken in conjunction with the accompanying drawings.

BRIEF DESCRIPTION OF THE DRAWING

FIG. 4 is a cross-sectional view taken substantially along line 4—4 of FIG. 2.

FIG. 5 is a view taken substantially along line 5—5 of FIG. 2.

DETAILED DECRIPTION OF THE PREFERRED EMBODIMENT

Figure 1:
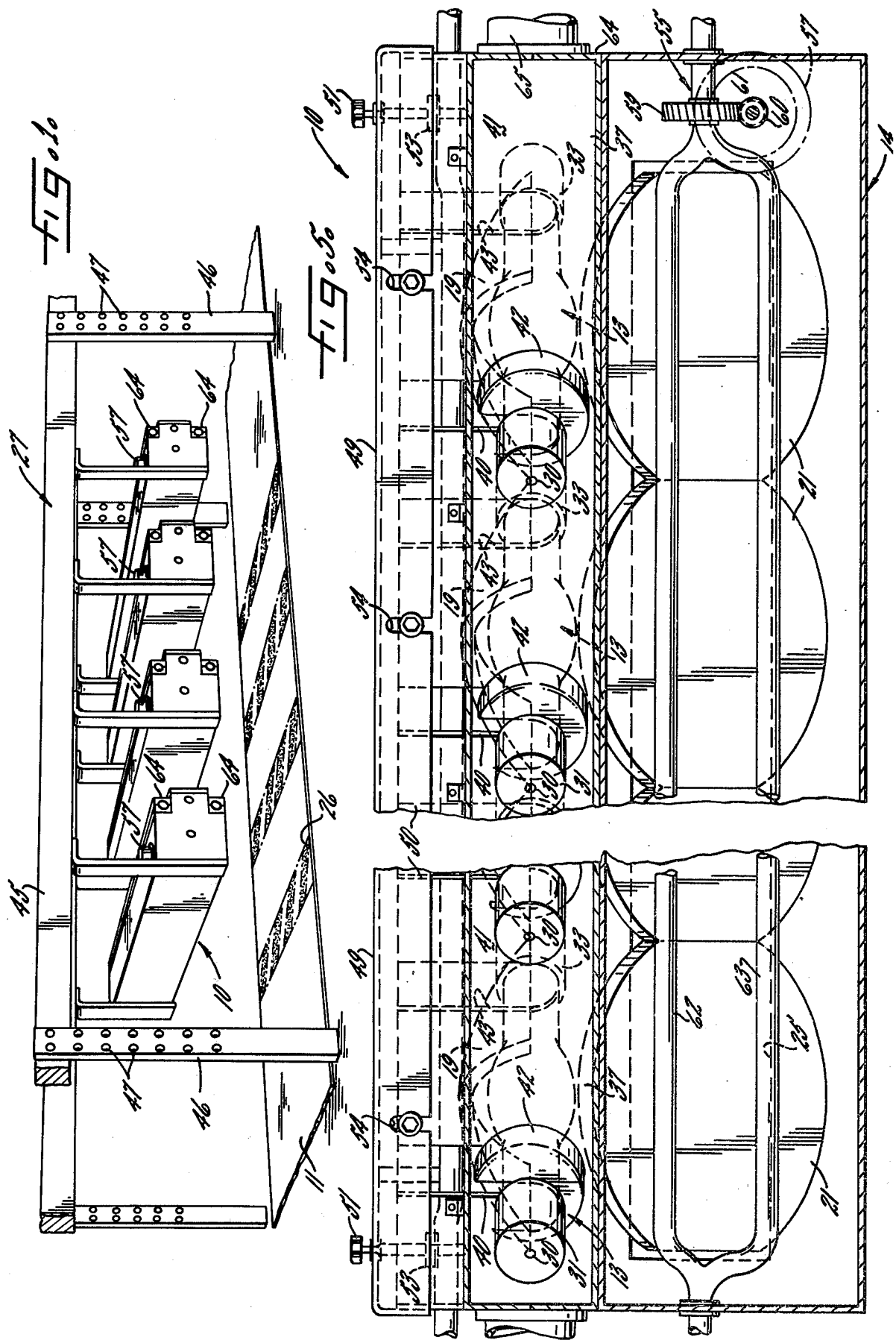
FIG. 1 is a perspective view of a cluster of ultraviolet radiation producing units embodying the novel features of the present invention mounted above a substrate coated with an ultraviolet light sensitive compound to treat said coating with ultraviolet radiation.

As shown in the drawings for purposes of illustration, the present invention is embodied in a unit 10 particularly adapted for use in quick setting or curing an ultraviolet-sensitive substance such as printing ink, paint, coating resin or the like which may be applied as a coating to a substrate 11 in the form of an article made of paper, metal plastic or other material. Herein, the substrate is in the form of a printed web of paper moving along a path located beneath the unit. As the web passes beneath the unit, ultraviolet radiation emitted from source means including a lamp 13 mounted within the unit housing 14 is reflected onto the web to effect quick curing of the ink on the web. Generally, the length of time required to cure the ink depends upon the intensity, that is, watts of radiation per unit of surface area of the web. Accordingly, up to a certain limit, the higher the radiation intensity, the quicker the ultraviolet-sensitive substance is cured on the substrate thereby enabling the substrate to be advanced more quickly beneath the unit. For different ultraviolet-sensitive substances, the upper limit of required radiation intensity may vary. Thus, for example, a black pigmented coating may require a radiation intensity that is three to ten times higher than for a coating containing other pigments.

In accordance with the primary aspect of the present invention the unit 10 is constructed in a particularly unique fashion to collect and concentrate the ultraviolet radiation emitted from the lamp 13 into a small area of high intensity on the coated substrate. For this purpose, ultraviolet radiation is emitted and collected from the source means in the form of a generally collimated beam 15 the rays of which are deflected by suitable means to form a second and continuing beam 16 of convergent rays concentrating the intensity of the radiaton upon progressing further toward the substrate 11. By virtue of constructing the unit in the foregoing fashion, the intensity of radiation striking the substrate is increased significantly over that emitted from the source means to advantageously achieve a high degree of efficiency in curing the ultraviolet-sensitive substance coated on the substrate.

Figure 2:
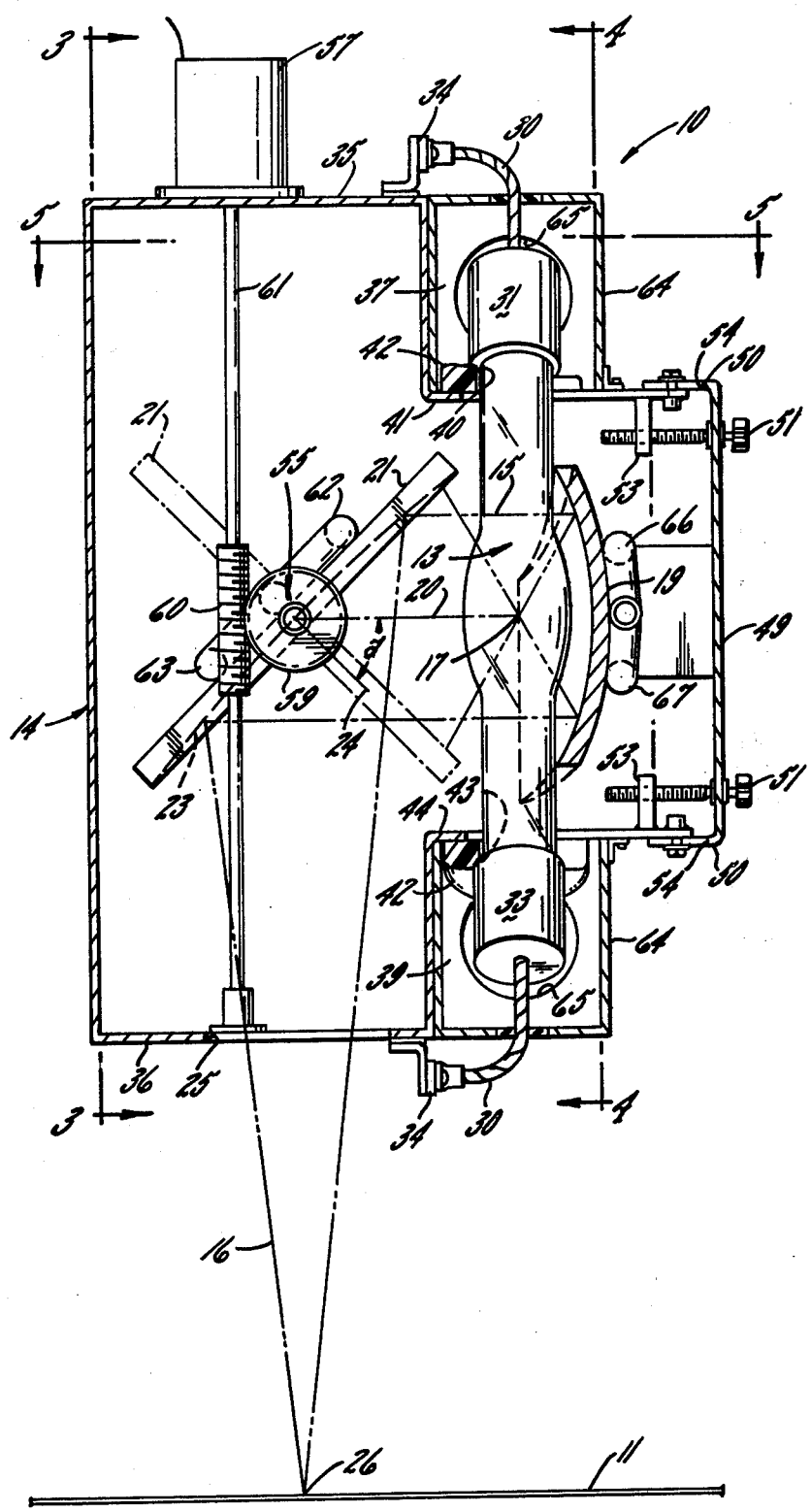
FIG. 2 is an enlarged, cross-sectional view taken substantially along line 2—2 of FIG. 3 with parts removed for clarity.

In the present instance, the source means of the unit 10 may include a lamp 13 such as a short arc mercury or mercury xenon lamp mounted within the housing 14 and whose arc 17 is located at the focus of a paraboloidal refector 19 and thus approximates a point source of ultraviolet radiation. Accordingly, the ultraviolet radiation which strikes the reflector from the lamp is reflected in the form of the generally collimated beam 15 traveling concentric with the axis 20 of the paraboloidal reflector and toward the means for forming the beam 16 of converging rays. Herein, this latter means comprises a spherical reflector 21 mounted within the housing opposite the paraboloidal reflector with the concave surface 23 of the spherical reflector facing the paraboloidal reflector and the axis 24 of the spherical reflector intersecting with the axis of the paraboloidal reflector at an acute included angle $a$ as measured between the two reflectors. It will be understood by those skilled in the art that while other means for forming the beam 16 of converging rays, as for example a lens, in line with the paraboloidal reflector may be employed in place of the spherical reflector 21 to do so would result in the optical problems well known in lens systems such as chromatic aberration and greatly reduced efficiency of light transfer. As shown in FIG. 2, the collimated beam 15 travels along a path paralleling the surface of the substrate and the spherical reflector is positioned so that the angle $a$ is approximately 45°. The radiation, thus, is reflected downwardly through the opening 25 in the bottom of the housing toward the surface of the substrate 11 with the rays of the second beam 16 converging upon the substrate to provide a magnified image 26 of the lamp arc at the focal plane of the spherical reflector. It will be understood by those skilled in the art that because the arc is partially shielded around its longitudinal axis by its electrodes, that the paraboloidal reflector 19 can be truncated and that the spherical reflector 21 captures the generally collimated beam even when rotated to the 45° position.

Advantageously, by converting the radiation from the lamp 13 into parallel rays, through the use of paraboloidal reflector the undesirable effects of spherical aberration which occur when using a spherical reflector to reflect light from a source located at a finite distance from said reflector are avoided. Moreover, by choosing spherical and paraboloidal reflectors having different focal lengths, magnified image of the lamp arc at the focal plane of the spherical reflector may be selected as desired to provide the particular intensity of radiation required for curing a specific coating.

With the surface of the substrate coating being at the image plane of the optical system, optimum light conditions are obtained, thereby allowing the calculation of intensities so as to meet the specified requirements of any particular coating. The abbreviated table below exemplifies how the focal length and diameter of the paraboloidal and spherical reflectors are matched to produce desired intensities at the substrate by the optical magnification of the arc dimensions; said magnification being equal to the focal length of the spherical reflector divided by the focal length of the paraboloidal reflector.

| TABLE OF MATCHED SPHERICAL & PARABOLOIDAL REFLECTORS | | | | |
|---|---|---|---|---|
| Spherical Reflector Data | Paraboloidal Reflector Data | Magnification Factor (M) $M = f_s/f_p$ | Image Area $I_A = A_a M^2$ | Radiation Intensity at substrate $R_I = P.F/I_A$ |
| D = 108mm r/c = 460mm $f_s$ = 230mm | D = 100mm $f_p$ = 25mm | 230/25 = 9.2 | for Arc 1mm × 5mm $I_A = 5mm^2(9.2)^2 =$ 423.2mm² [Image size = 9.2mm × 46mm] | for 1000W lamp $R_I = \dfrac{1000WF}{423.2mm^2}$ $= 2.36 \dfrac{WF}{mm^2}$ |
| D = 152mm r/c = 300mm | D = 140mm $f_p$ = 25mm | $\dfrac{150}{25} = 6$ | for Arc 1 mm × 5mm $I_A = 5 \times 6^2 =$ 180mm² [$I_S$ = 6mm × 30mm] | for 1000W lamp $R_I = \dfrac{1000WF}{180mm^2}$ $= 5.5 \dfrac{WF'}{mm^2}$ |
| D = 152mm r/c = 810mm $f_s$ = 405mm | D = 150mm $f_p$ = 37.5mm | 405/37.5 = 10.8 | for Arc 1mm × 5mm $I_A = 5mm^2(10.8)^2$ 583.2mm² [$I_S$ = 10.8mm × 54mm] | for 2500W lamp $R_I = \dfrac{2500WF}{583.2mm^2}$ $= \dfrac{4.29WF}{mm^2}$ |
| D = 152mm r/c = 2450mm $f_s$ = 1225mm | D = 150mm $f_p$ = 37.5mm | $\dfrac{1225}{37.5} = 32.6$ | for Arc 1mm × 5mm $I_A = 5mm^2 \times (32.6)^2 =$ 5313.8mm² [$I_S$ = 32.6mm × 163mm] | for 2500W lamp $R_I = \dfrac{2500WF}{5313.8mm^2}$ $= \dfrac{0.47WF}{mm^2}$ |

(D = diameter; R/C = radius of curvature; $f_s$, p = focal length, spherical reflector, paraboloidal reflector; P = rated power in watts; F = efficiency factor; $A_a$ = area arc); The efficiency factor F is the product of (electrical to light conversion) × (% total light radiated by arc that is collected by paraboloidal reflector) × (% reflection of light from paraboloidal reflector) × (% reflection of light from spherical reflector).

From the foregoing table, it will be appreciated that, given the desired radiation intensity for a particular substrate coating, a matched set of spherical and paraboloidal reflectors 21 and 19 having the appropriate focal lengths and diameters may be selected to obtain the desired intensity. An image width is then chosen from a grouping of like intensities to give a desired time of exposure. To accommodate spherical reflectors of different focal lengths, the unit 10 is movable vertically with respect to the substrate 11 so that the magnified image may be focused on the surface of the substrate coating for optimum curing. By changing the spherical and paraboloidal reflectors, the image area focused on the substrate coating may be magnified from between three to thirty times and, preferably, from between five to twenty times over the arc area of the lamp to obtain different ranges of desired radiation intensities.

In accordance with another important aspect of the present invention, a plurality of spaced units 10 are arranged together in a cluster 27 forming a unique system for treating the substrate 11 with intensified ultraviolet radiation. For this purpose, a plurality of short-arc lamps with associated pairs of paraboloidal and spherical reflectors 19 and 21 are mounted within each unit to provide a series of intensified ultraviolet beams which strike the substrate at spaced positions along the width of the substrate. The beams of each unit are staggered with respect to the beams of the other units so that collectively the intensified beams from the cluster cover the full width of the substrate for curing the ultraviolet-sensitive substance on the surface of the substrate. In the case of no significant overlapping of images the number of short-arc lamps in each unit is designed to be equal to the width of the substrate divided by the larger diameter of the spherical or paraboloidal reflector. The number of units required in a cluster is designed to be equal to the larger reflector diameter divided by the lateral projection of the arc image length on the substrate. It will be understood by those skilled in the art that in treating a substrate having a small width, as for example a ribbon, that a single arc-lamp and its associated paraboloidal spherical reflectors may be employed to cure the coated substrate.

In the preferred embodiment of the invention, designed to cure a coated substrate whose width measures 32 inches; each unit 10 includes an array of eight lamps 13 mounted within the housing with the longitudinal axes 29 of the lamps lying equally from each other within a vertical plane extending laterally of the substrate 11. More particularly, when using mercury xenon lamps designed for vertical positioning, the operating characteristics of the mercury xenon lamps require the axes of the lamps to be inclined within a plane forming an angle b (see FIG. 4) of approximately 30° with respect to vertical. Leads 30 from the upper and lower ends 31 and 33 of the lamps are connected to upper and lower conductor bars 34 connected to a suitable source (not shown) of electricity for energizing the lamps.

As shown in FIG. 2, the conductor bars are suitably insulated from and mounted on the upper and lower panels 35 and 36 of the housing to extend along the length of the housing. To mount the lamps within the housing, the latter includes upper and lower channel-shaped recesses 37 and 39 formed within the upper and lower panels 35 and 36 of the housing adjacent the backside thereof. Suitably sized, rearwardly opening U-shaped notches 40 (see FIG. 5) are formed in the lower wall 41 of the upper recess 37 to receive the enlarged upper end portions 31 of the lamps. Similar notches 43 are formed in the upper wall 44 of the lower recess in offset vertical relation with respect to the upper notches 40 to receive the enlarged lower end portions 33 of the lamps. In this way the lamps are supported vertically within the housing resting on electrically insulating collars 42 within boxes 64 with the axes 29 of the lamps suitably inclined with respect to vertical.

Supporting the cluster 27 of units 10 is a frame 45 having upright members 46 provided with vertically spaced openings 47 by way of which the units may be bolted to the frame in selected vertical positions with respect to the substrate 11 to accommodate spherical reflectors 21 having differing focal lengths. In addition, the units are individually supported on the frame in laterally offset relation to each other so as to stagger the lateral positions of the beams of the units with respect to the beams of the other units and thereby provide for solid coverage of the surface of the substrate with intensified ultraviolet radiation completely across the width of the substrate coating.

Within each unit 10, the paraboloidal reflectors 19 are secured to a channel-shaped back panel 49 of the housing, the reflectors being spaced from each other so that when the back panel is fastened to the housing the lamps are located with their arcs located at the foci of the reflectors. As shown in FIG. 2, upper and lower horizontal flanges 50 of the back panel telescope with the upper and lower walls 41 and 44 of the housing recesses 37 and 39 to be bolted to such walls.

To precisely locate the paraboloidal reflectors 19 with respect to the lamps 13, vertically spaced adjusting screws 51 are located at opposite ends of the back panel 49 and extend through the panel to mate with inwardly extending projections 53 integrally formed with the upper and lower recess walls 41 and 44. Rearwardly opening slots 54 in the flanges at the bolted connections between the housing 14 and the back panel permit the panel to be slid horizontally when turning the adjusting screws to precisely locate the paraboloidal reflectors.

In accordance with still another aspect of the present invention, the spherical reflectors 21 are mounted pivotally within the unit 10 to turn between a first position reflecting the ultraviolet radiation toward the substrate and a second position reflecting the radiation in some other direction so as to avoid damaging the substrate 11 should movement of the latter along the conveyor beneath the unit stop. For this purpose, the spherical reflectors are mounted on a support member 55 (see FIG. 3) journaled between opposite end panels 56 of the housing 14. A motor 57 mounted on the housing between the two positions.

More particularly, as shown in FIG. 2, a worm gear 59 is secured to the support member 55 adjacent one end thereof and meshes with a worm 60 formed intermediate the ends of a drive shaft 61 projecting downwardly from the motor 57 (of the fractional horse power-type) and into the housing 14. Herein, the motor is of the reversible gear reduction type for rotating the shaft in one direction or the other to pivot the spherical reflectors back and forth between the aforementioned first and second positions. In the first position, the reflectors are located with their axes 24 forming the angle $a$ with respect to the axes 20 of the paraboloidal reflectors 19. In the second position, the spherical reflectors, preferably, are rotated 90° counterclockwise (See FIG. 1) from their first position to reflect the focused beam 16 180° from its normal direction. Thus, damage to the substrate 11 from excessive radiation is avoided when movement of the substrate is halted beneath the unit by simply actuating the motor 57 to turn the spherical reflectors away from the substrate.

Figure 3:
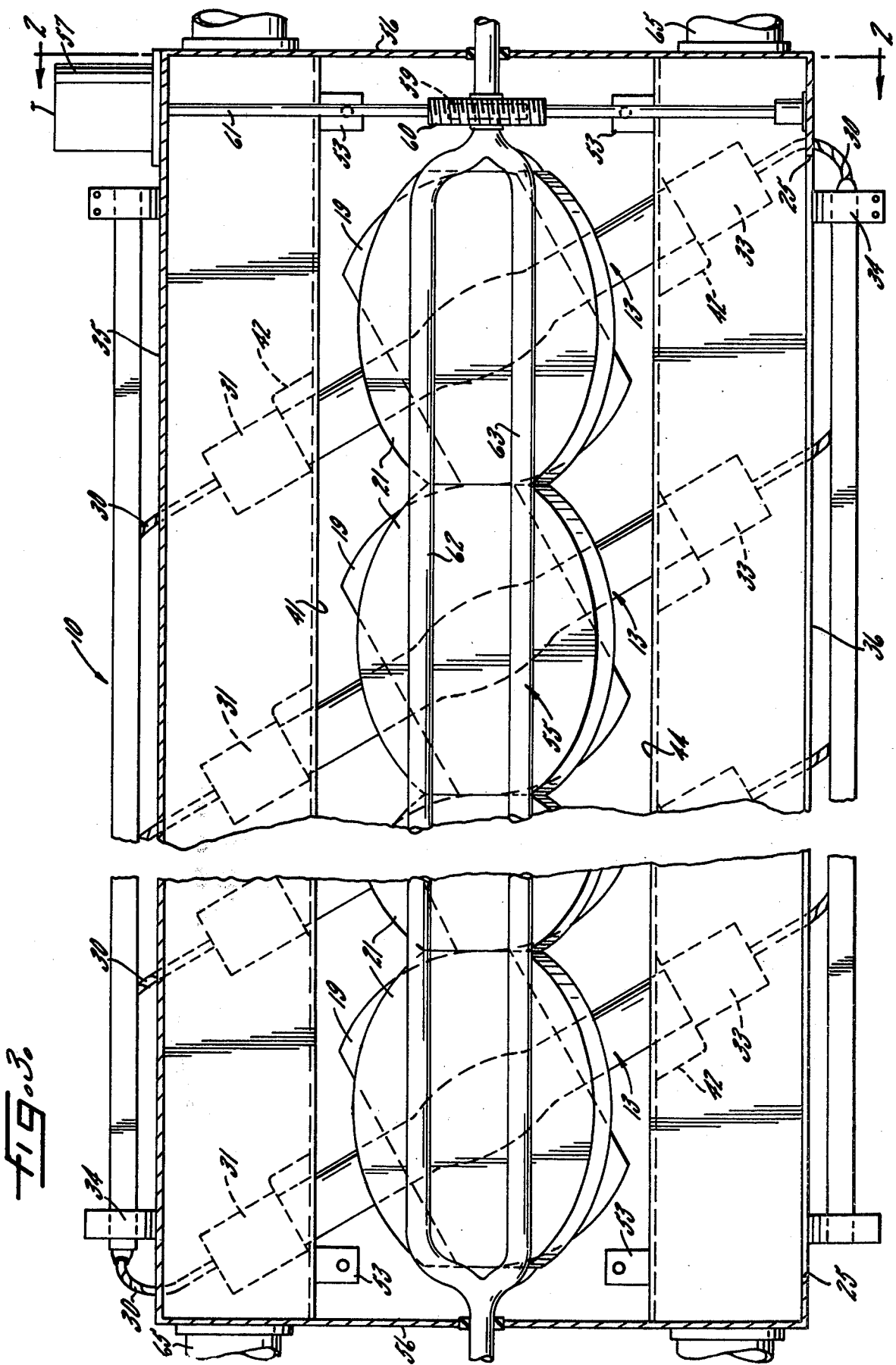
FIG. 3 is a fragmentary, cross-sectional view taken substantially along line 3—3 of FIG. 2.

Another advantageous feature of the present invention contemplates a novel arrangement for cooling the reflectors 19 and 21 and the lamps 13 during in service use of the unit 10. Preferably, both reflectors are formed of a highly efficient thermally conductive material such as aluminum and a coolant liquid from a suitable source (not shown) is circulated behind the reflectors to absorb heat from the reflectors. As illustrated in FIG. 3, the support mounting 55 for the spherical reflectors 21 is hollow and includes upper and lower branches 62 and 63 permitting the coolant liquid to be circulated along the backside of the reflectors to dissipate heat from such reflectors. Similarly, the paraboloidal reflectors 19 are supported on the back panel 49 of the housing 14 by upper and lower hollow members 66 and 67 through which the liquid circulates.

To cool the lamps 13 around their sockets, cool air is circulated past the upper and lower end portions 31 and 33. Herein, the end portions of the lamps are enclosed by elongated electrically insulated boxes 64 captivated within the upper and lower recesses 37 and 39. Openings 65 in opposite ends of the boxes permit cold air from a source (not shown) to be pumped through the boxes for cooling purposes.

In the embodiment hereinabove described the coated substrate 11 moved along a path located beneath a stationary unit 10, however, those skilled in the art will understand that the unit 10 could be moved over a stationary coated substrate 11 to cure the coating thereon without departing from the scope of the invention.

I claim as my invention;

1. A unit for treating a substrate with ultraviolet radiation, said unit comprising:
   a housing spaced from the substrate;
   at least one radiation producing source carried by said housing;
   a paraboloidal reflector carried by said housing adjacent each of said sources, with said source being located substantially at the focus of said paraboloidal reflector so that the reflector produces a generally collimated beam of radiation oriented generally parallel to the substrate;
   a concave, spherical reflector carried by said housing for each of said paraboloidal reflectors, said spherical reflector being spaced away from said source and said paraboloidal reflector and intercepting said collimated beam and reflecting the same so that the rays of said beam converge toward each other upon progressing toward said substrate to thereby concentrate the radiation intensity of said beam which strikes said substrate, said spherical reflector having a focal length substantially greater than the focal length of said paraboloidal reflector.

2. A unit as defined in claim 1 wherein each of said radiation producing sources comprises a short arc ultraviolet lamp.

3. A unit as defined in claim 1 including means for moving said spherical reflector so that it directs said beam away from said substrate.

4. A unit as defined by claim 1 wherein said paraboloidal reflector includes an axis extending generally parallel with the substrate so the generally collimated beam produced by said paraboloidal reflector is directed toward said spherical reflector and follows a path extending generally parallel with the substrate, said spherical reflector having an axis normally forming an acute included angle with respect to the axis of said paraboloidal reflector to reflect and focus said beam toward said substrate.

5. A unit defined by claim 4 wherein said spherical reflector is mounted pivotally within said housing to swing from a first position with the axis of said spherical reflector extending in one direction so as to form said acute angle with respect to the axis of said paraboloidal reflector and a second position with the axis of said spherical reflector extending in another direction thereby to keep from reflecting said beam toward said substrate.

6. A unit as defined by claim 5 wherein said means for selectively moving said reflector includes a motor mounted on said housing and driving connected with said spherical reflector to pivot said reflector selectively between said first and second positions.

7. A unit as defined by claim 6 including hollow mountings supporting said spherical and paraboloidal reflectors within said housing, said reflectors being formed of a thermally conductive material, said mountings being adapted to be connected to a source of liquid coolant for circulation therethrough to cool said reflectors during use.

8. A unit as defined by claim 7 including enclosures formed in said housing around the opposite end portions of said lamp, said enclosures being adapted to be connected to a source of cooling gas for circulating cool gas therethrough to cool the lamp socket during use.

9. Apparatus for treating a substrate with ultraviolet radiation, said apparatus comprising a cluster of units spaced from each other along a predetermined path, each of said units including a housing, an array of short arc, ultraviolet lamps mounted within said housing and spaced from each other generally laterally across said path, a paraboloidal reflector associated with each of said lamps, said relectors being mounted within said housing with the arc of said associated lamps being located at the foci of said reflectors so that the radiation reflected from each of said reflectors forms a generally collimated beam, a generally spherical, concave reflector associated with each of said paraboloidal reflectors, said spherical reflectors being mounted within said housing generally at the same distance from said substrate as their associated paraboloidal reflectors, spaced from their associated paraboloidal reflectors and normally positioned to receive the beams from their associated paraboloidal reflectors and reflect said beams toward said substrate, each of said spherical reflectors having a focal length substantially longer than the focal length of its associated paraboloidal reflector so as to magnify the radiating area of the lamp arc into a larger image area of radiation focused on the substrate but with the image area representing a small percentage of the total substrate surface to be treated, said lamps within each unit of said cluster being staggered with respect to the lamps of the other units so the image areas of the reflected beams cover in overlapping fashion the total surface area of the substrate to be treated, and means for selectively pivoting said spherical reflectors within each of said units to deflect the beams away from the substrate.

10. A method for utilizing ultraviolet radiation to treat a substrate while moving relative to the radiation along a preselected path, said method comprising the steps of projecting onto the surface of the substrate a plurality of lateral rows of image areas of high intensity radiation from an equal number of radiation sources of predetermined size, with the image areas in each row being spaced equally from each other and with the image areas in each of the rows being staggered with respect to the image areas in each of the other rows, said projecting of each of said image areas from their associated sources being achieved by forming a generally collimated beam of ultraviolet radiation from one of the sources with a paraboloidal reflector, directing said collimated beam from said paraboloidal reflector toward a spherical reflector spaced from and located approximately the same distance from said surface as said paraboloidal reflector and focusing the beam on the surface of the substrate with the spherical reflector to produce the image area of intense radiation which is magnified in range of about 3 to about 30 times over the dimensions of the source, said magnification being determined by the ratio of the focal length of said spherical reflector to the focal length of said paraboloidal reflector.

11. A method of treating a substrate as defined by claim 10 including the step of moving said substrate along a path at a preselected speed relative to said beam while keeping the surface of said substrate generally within the plane of said image area to expose the length of said substrate to said radiation.

12. A unit for treating a substrate with ultraviolet radiation as the substrate moves along a generally planar path, comprising:
at least one short-arc ultraviolet lamp for producing ultraviolet radiation;
a paraboloidal reflector for each of said lamps, said paraboloidal reflector having a first focal length, the arc of said lamp being located substantially at the focal point of said paraboloidal reflector so as to produce a generally collimated beam in a direction generally parallel with said substrate;
a concave spherical reflector for each of said paraboloidal reflectors and having a second focal length, said spherical reflectors being in position to receive and deflect said rays of said beam toward said substrate, said spherical reflector causing the rays to converge toward each other as they progress toward said substrate to thereby concentrate the radiation intensity of said beam which strikes said substrate;
said second focal length being substantially greater than said first focal length, the dimensions of the area of said beam striking said substrate bearing in relation to the dimensions of the arc of said lamp equal to the ratio of the second focal length to said first focal length.

13. A method of treating a substrate with ultraviolet radiation of a predetermined intensity, comprising the steps of:
normally moving said substrate along a predetermined path at a predetermined speed;
emitting ultraviolet radiation from at least one source of predetermined area;
capturing said ultraviolet radiation from each of said sources with a paraboloidal reflector and reflecting said ultraviolet radiation into a generally collimated beam generally parallel with said substrate;

reflecting each of said collimated beams toward said substrate with a spherical reflector spaced from said substrate a distance so as to produce an imaging area of ultraviolet radiation generally at the elevation of the substrate, the dimensions of the imaging area of said ultraviolet radiation being magnified with respect to the source dimensions in proportion to the ratio of the focal length of said spherical reflector to the focal length of said paraboloidal reflector.

14. A method as defined in claim 13 further including the step of rotating said spherical reflector to direct said beam out of contact with said substrate in the event said substrate stops moving, so that said substrate is not subjected to excessive radiation.

* * * * *